United States Patent [19]
Meichel

[11] Patent Number: 5,188,491
[45] Date of Patent: Feb. 23, 1993

[54] METHOD FOR CUTTING THE FLANKS OF AN INFEED WORM AND WORM MILLING MACHINE

[75] Inventor: Otto Meichel, Neutraubling, Fed. Rep. of Germany

[73] Assignee: Krones AG Hermann Kronseder Maschinenfabrik, Neutraling, Fed. Rep. of Germany

[21] Appl. No.: 598,612

[22] PCT Filed: Apr. 26, 1989

[86] PCT No.: PCT/EP89/00456
§ 371 Date: Oct. 23, 1990
§ 102(e) Date: Oct. 23, 1990

[87] PCT Pub. No.: WO89/10225
PCT Pub. Date: Nov. 2, 1989

[30] Foreign Application Priority Data
Apr. 27, 1988 [DE] Fed. Rep. of Germany ....... 3814241

[51] Int. Cl.$^5$ .......................... B23G 1/32; B23G 1/36
[52] U.S. Cl. .................... 409/66; 51/95 TG; 51/287; 409/71; 409/77
[58] Field of Search ...................... 409/38, 39, 41, 51, 409/66, 76, 77, 71, 72, 157, 246, 259, 260, 268, 275; 51/95 TG, 80 A, 87 R, 287

[56] References Cited
U.S. PATENT DOCUMENTS
| | | | |
|---|---|---|---|
| 1,344,607 | 6/1920 | Samotej | 409/66 |
| 2,551,359 | 5/1951 | Bannow et al. | 409/259 X |
| 4,798,504 | 1/1989 | Erwin et al. | 409/51 X |

FOREIGN PATENT DOCUMENTS
| | | | |
|---|---|---|---|
| 521180 | 7/1921 | France | 409/77 |
| 0007210 | 1/1988 | Japan | 409/66 |

*Primary Examiner*—Z. R. Bilinsky
*Attorney, Agent, or Firm*—Fuller, Ryan, Hohenfeldt & Kees

[57] ABSTRACT

Feed screws are used for container filling machines in order to separate a series of approaching containers at a specific distance from each other. Feed screws for non-rotationally symmetrically shaped containers are milled with a milling tool rotating at a high rpm, the shaft of which is arranged parallel to the longitudinal axis of the feed screw that rotates at a lower rpm. To avoid feed screw flank errors, the rotating milling tool is moved up and down in an oscillating manner, so that a milling tool can be used, the contours of which agree exactly with the associated cross sectional area of the containers which are to be handled. The first shaft of the milling tool is attached to a sliding carriage, which is movably guided in an upward and downward direction by means of a crank mechanism.

11 Claims, 5 Drawing Sheets

METHOD FOR CUTTING THE FLANKS OF AN INFEED WORM AND WORM MILLING MACHINE

BACKGROUND OF THE INVENTION

The invention relates to a method for milling the flanks of a feed screw and to a feed screw milling machine.

Feed screws of the type under consideration are used in container filling machines such as, for example, bottle filling machines, in order to position a series of approaching containers at a specific distance corresponding to the respective incremental machine spacing. For this purpose, such feed screws are also arranged between successive stations of a filling machine, so that the containers are transferred at a predetermined distance from each other.

In order to transfer the containers, which generally either have no distance or only a small distance between themselves, to the feed screw, a spiral groove is milled into the feed screw, the pitch of the flanks of which varies along the length of the feed screw and, in this particular case, in such a manner that the pitch increases from the point where the containers enter the feed screw toward the point of exit.

The spiral shaped groove is milled into a feed screw blank by means of a milling tool that rotates at high rpm, with the feed screw blank rotating at a much lower rpm, while either the milling tool or the feed screw is moved at variable speed in the axial direction. If the feed screw which is to be produced is intended for use in the handling of rotationally symmetrical containers, the rotating milling tool is arranged relative to the feed screw blank in such a way that the shaft of the milling tool extends at a right angle with respect to the longitudinal axis of the feed screw blank. The milling tool has a linear milling edge and mills the spiral shaped grooved independent of the instantaneous feed screw pitch with the required precision and without flank errors, so that the production of a feed screw for rotationally symmetrical containers is largely free of problems.

However, if the feed screw is intended for use in handling containers that are not rotationally symmetrical, it should then have a spiral shaped groove with a cross sectional area that is suited to the container which is to be handled. In order to mill the spiral shaped groove in this case, the arrangement is configured such that the shaft of the milling tool extends parallel to the longitudinal axis of the feed screw blank.

If the milling tool has a shape that precisely agrees with the associated cross sectional area of the container shape that is to be handled, then, as a result of a changing pitch when the groove is milled, there is an increasingly greater feed screw flank error as the pitch increases, that is, the spiral shaped groove becomes narrower as the pitch becomes increasingly larger, whereby the crooked positioning or even a crushing of the containers can occur. This feed screw flank error presently is corrected by employing a specifically oversized milling tool, but has the disadvantage that the spiral shaped groove that is milled-in only agrees with the shape of the container which is to be handled at a very specific pitch. But at any of the other areas along the feed screw the containers are not grasped and transferred in an error free manner, since the pitch usually increases in the direction from the start of the feed screw toward the end.

A further feature of the invention is the development of a method for milling the flanks of a feed screw of the type considered, such that the occurrence of an error at the feed screw flank with variable feed screw pitch is avoided to the greatest degree possible Additionally, a feed screw milling machine should be specified whereby a groove specifically defined for the associated cross section of a container shape which is to be handled can be milled into a feed screw blank without the appearance of an error in the flank of the feed screw at variable pitches.

SUMMARY OF THE INVENTION

In the method according to the invention, the rotating milling tool is moved up and down during the milling procedure. This entails the consequence that the milling tool forms the contour of the containers grasped later by the feed screw, whereby the occurrence of the previously common flank error is avoided, so that a milling tool can be used which has a contour that agrees with the associated cross sectional area of the containers which are to be handled. The containers are thereby grasped and transferred in an error free manner along the entire range of the feed screw, so that a smooth work-sequence is assured in the area of the feed screw.

In order to protect the milling machine and the feed screw blank, and to increase the working precision, it is further recommended that the spiral shaped groove be initially pre-milled, preferably by two successive milling procedures without an oscillation of the milling tool and, following that, a third milling procedure is carried out with an upward and downward directed oscillation of the milling tool. The third milling procedure hereby only has the task of eliminating flank errors produced by the first two milling procedures.

According to the invention, it is recommended that the rotating milling tool be moved up and down at a rate of 7 to 8 dual-strokes per second, while the milling tool rotates at 3,800 to 4,000 rpm.

With a feed screw milling machine according to the invention, the shaft of the milling tool is attached to a sliding carriage which is arranged so as to be movable upward and downward on a guide at a right angle to the longitudinal axis of the feed screw. The oscillating movement of the sliding carriage is advantageously generated by a crank mechanism driven by a motor. The stroke of the carriage should be about 60 mm in both directions, if the feed screw which is to be worked has the usual diameter. The sliding carriage is preferably composed of cast aluminum, resulting in a relatively low weight.

If the shaft of the milling tool is driven by means of a belt drive, preferably by a toothed belt drive, which is the usual case, then, according to the invention, it is recommended that a first toothed belt connects a first toothed pulley that is driven by a motor to an intermediate toothed pulley, which drives a third toothed pulley that is attached to the shaft of the milling tool by means of a second toothed belt, and that the intermediate toothed pulley is arranged on a movably supported second sliding carriage. This second sliding carriage should be movably guided in a forward and reverse direction relative to the feed screw at a right angle to the travel of the first sliding carriage. This design has the advantage that the toothed belt drive can closely follow the stroke movement of the first carriage without excessively stretching the toothed belt. Since the intermediate toothed pulley can correspondingly follow the respective movement of the first sliding carriage by means of a horizontal sliding movement of the second sliding carriage, a corresponding stretch of the associated second toothed belt is almost completely avoided, while the first toothed belt only experiences slight stretching with the movement of the second carriage, which lies within permissible limits.

The invention suggests, with considerable advantage, that the sliding carriage along with the milling tool, the crank mechanism and the accessory belt drive are attached to a framework which is supported so as to be swiveled around an axis which is at a right angle to the longitudinal axis of the feed screw, whereby this swivel angle should be 90°. Hence, the shaft of the milling tool can be swiveled from a position parallel to the longitudinal axis of the feed screw, and into a position that is at a right angle to this, which it assumes in order to mill a feed screw for handling rotationally symmetrical containers. Thus, the feed screw milling machine according to the invention can be used for producing both types of feed screws, whereby the milling procedure for the groove corresponding to the rotationally symmetrical containers obviously takes place without an oscillating movement of the milling tool.

The respective work position for the swiveling framework can be locked-in pneumatically. For this, it is recommended that a pneumatically actuated locking pin with a tapered head section enter into a correspondingly shaped recess in the swiveling framework. If the framework is to be swiveled into the other work position, the locking pin is pulled back out of the recess in the framework.

A more detailed description of a preferred embodiment of a feed screw milling machine and the new milling method will now be set forth in reference to accompanying drawings.

DESCRIPTION OF A PREFERRED EMBODIMENT

Figure 1:
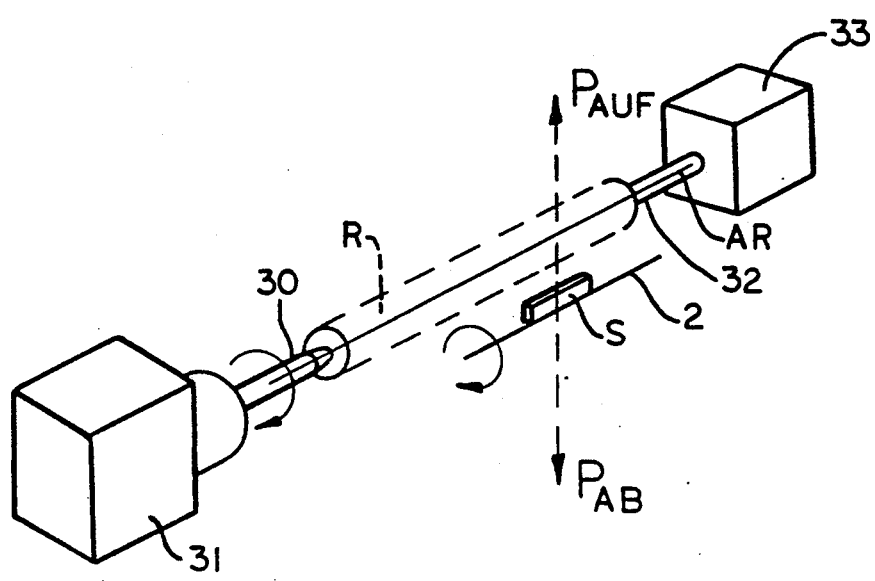
FIG. 1 is a diagrammatic sketch explaining the method according to the invention.

FIG. 1 is a diagrammatic sketch, on the basis of which the method according to the invention will now be explained. R in FIG. 1 represents a solid cylindrical blank which is composed of, for example, plastic. At this point, a flank pitch is to be milled into the blank for the production of a feed screw for containers. Milling the blank is carried out by means of a milling tool S, which can be applied to the blank and is driven at a high rpm around the shaft 2. The blank rotates around the axis $A_R$ in a clockwise or counter clockwise direction. The shape of the milling tool S is determined by the shape of the containers that are to be transported later by the feed screw. If the shaft 2 of the milling tool is applied to the blank, the milling tool S mills a depression that corresponds to the milling tool. The shaft 2 thereby extends parallel to the axis $A_R$ of the blank. The blank R is supported for rotation by a spindle 30 that bites into an end of the blank. Spindle 30 is driven rotationally by a headstock 31. The opposite end of the blank R is supported on a centering pin 32 which extends from a tailstock 33. A coordinated relative movement of the milling tool S on the one hand and the blank R on the other, in the extended direction of the axis $A_R$ or the shaft 2, causes the milling of the appropriate flanks with the desired, varying pitch. According to the invention, during this milling procedure the shaft 2 of the milling tool S now oscillates in the direction of the arrow $P_{auf}$ (up) $P_{ab}$ (down) upward and downward, which leads to the consequence that feed screw flank errors are avoided, since the blank, at each position and independent of the pitch, possesses the appropriate width for the containers which are to be transported.

Figure 2:
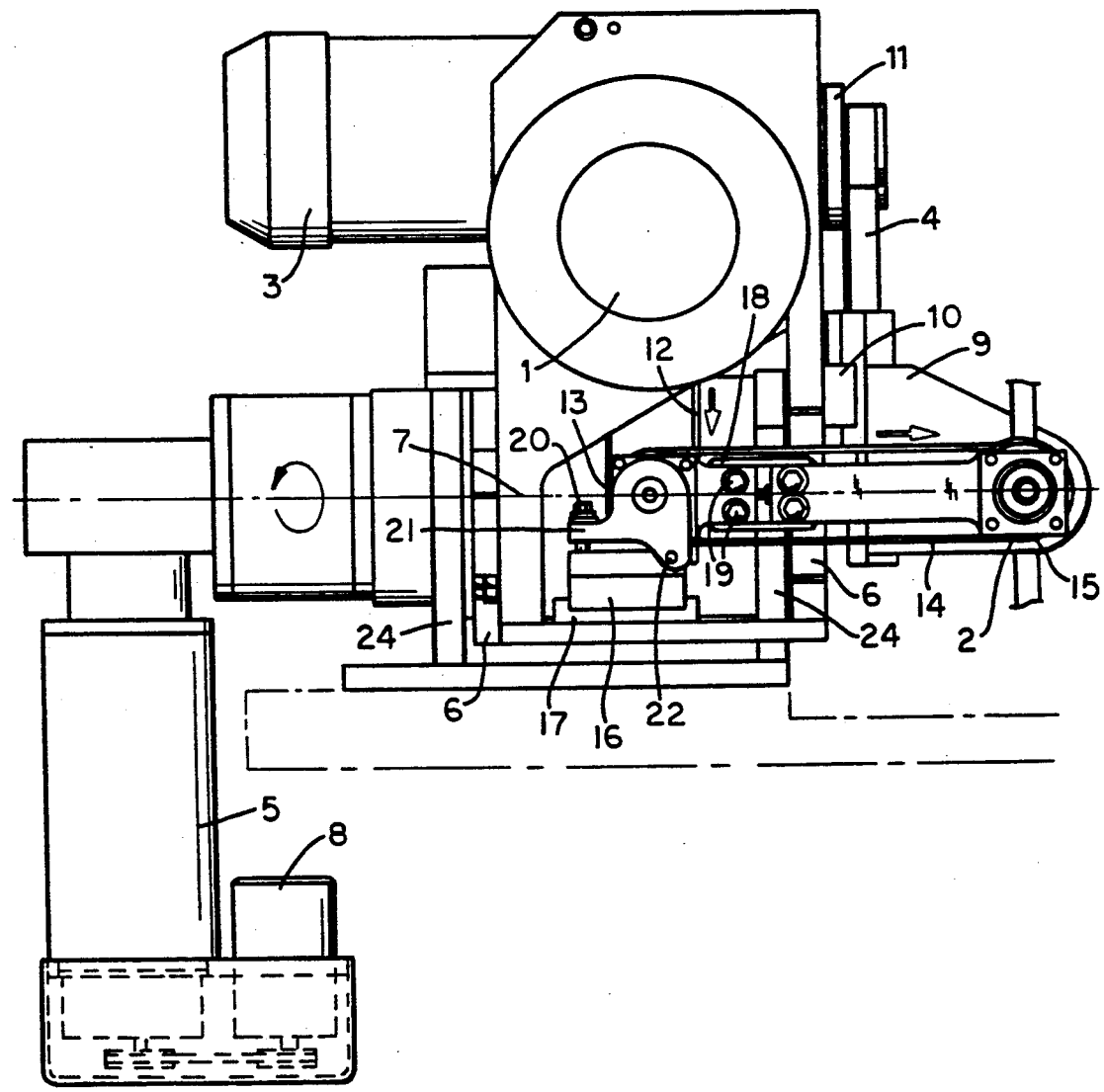
FIG. 2 is a lateral schematic view of the feed screw milling machine.

A feed screw milling machine with which such a milling method can be implemented will now be specified, based on FIGS. 2 to 5. The actual milling machine is represented in these figures, while the installation for rotatably grasping (chucking) the feed screw blank R which is to be worked is not illustrated. The milling machine, as FIG. 2 shows schematically, includes three drive motors: drive motor 1 for the shaft 2 of the milling tool S shown in FIG. 1, drive motor 3 for a crank mechanism 4, and drive motor 5 for swiveling a framework 6 around an axis 7. The drive motor 5 is connected to the mechanism that causes the rotation of 8. The shaft 2 of the milling tool is rotatably supported in a sliding carriage 9. The sliding carriage 9 on the one hand is arranged so as to be movable in an upward and downward direction on a guide 10, so that the sliding carriage causes the upward and downward movement of the milling tool S as indicated in FIG. 1 b $P_{auf}$(up) and $P_{ab}$ (down). For this purpose, the sliding carriage 9 is articulated with the lower end of the crank mechanism 4. The upper end of the crank mechanism is eccentrically articulated with a disk 11 (see also FIG. 3). The disk is driven by the drive motor 3. This drive motion moves the cranking mechanism for the sliding carriage 9 upward and downward, whereby the milling tool is also, in addition to the rotating movement occurring around the shaft 2, moved in an oscillating manner upward and downward.

The drive motor 1 serves to drive the milling spindle 2. For this, the drive motor is connected with an intermediate toothed pulley 13 by means of a toothed belt 12, said intermediate toothed pulley being connected to a toothed pulley so as to be driven by a second toothed belt 14, said toothed pulley 15 in turn being attached to the shaft 2 of the milling tool. The second toothed belt 14 extends at an approximate 90° angle relative to the first toothed belt 12 as represented in the resting position in FIG. 1. The intermediate toothed pulley 13 is attached to a second sliding carriage 16. This sliding carriage in turn rests on a guide 17 and is arranged in this guide so as to be horizontally movable in a forward and reverse direction. To place the toothed belt 14 under tension, a U-profile 18 with oblong holes which are not illustrated in greater detail, and into which set screws 19 can extend, is provided. The part 18 also connects the toothed pulleys 13 and 15. The toothed belt 12 has initial tension applied by tightening a nut 20, whereby a support mounting 21 for the intermediate toothed pulley 13 is swiveled around an axis 22, on which the support mounting 21 that articulates with the sliding carriage 16 is connected.

Figure 3:
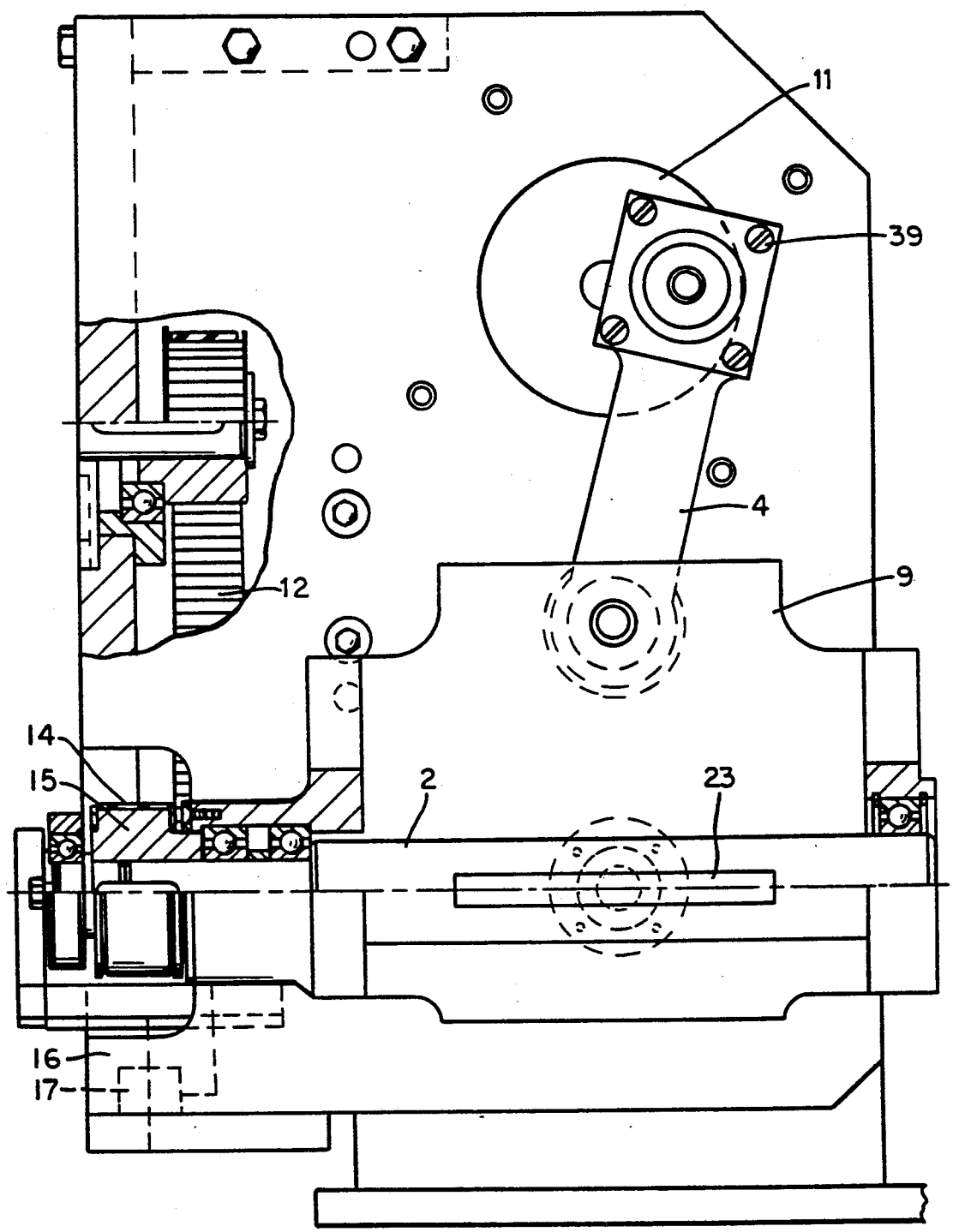
FIG. 3 is a front view of the milling machine according to FIG. 1.
Figure 4:
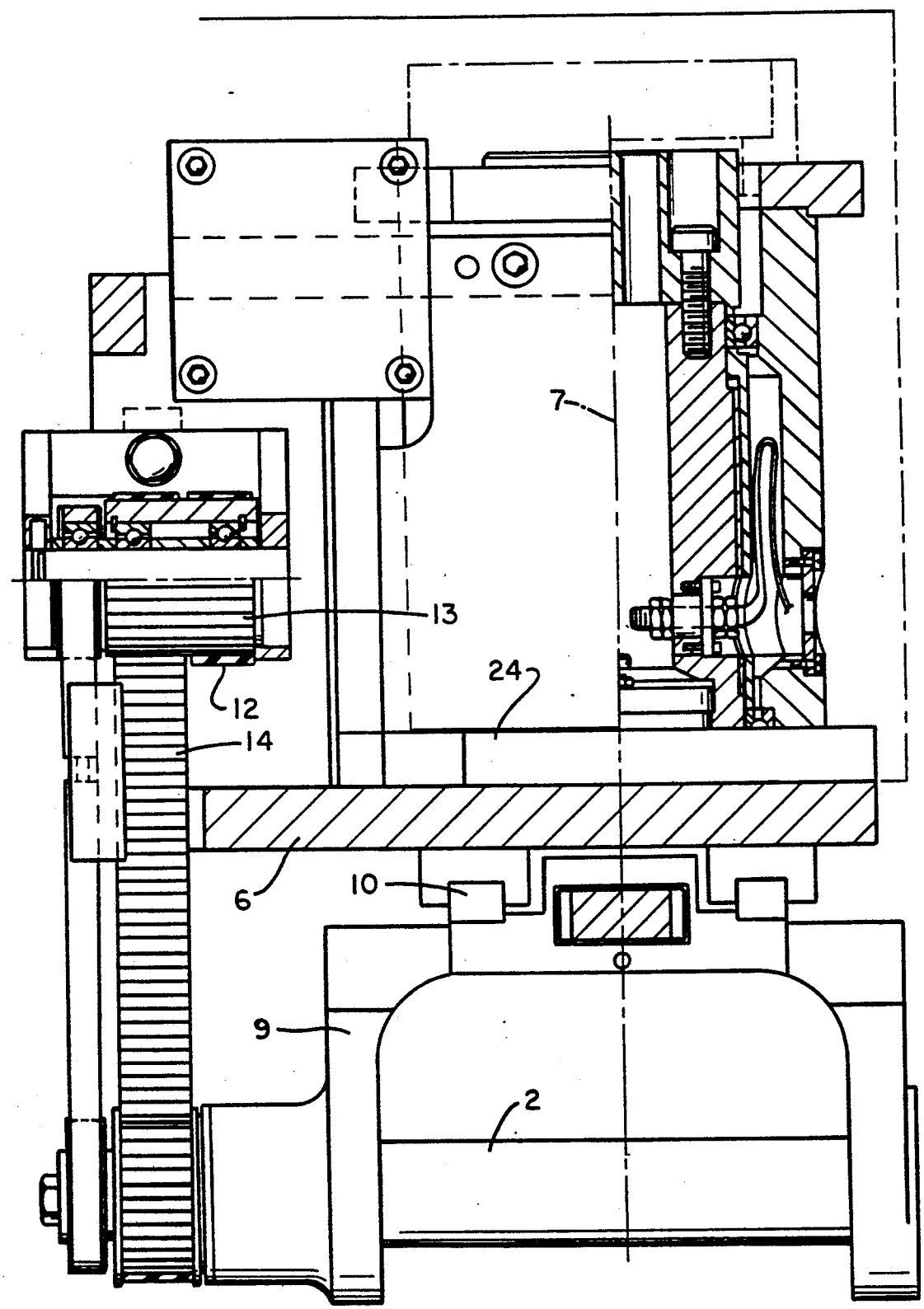
FIG. 4 is a top view of the milling machine.

If the disk 11, on which the crank mechanism 4 is eccentrically connected, is rotated with a rotating shaft 2, the crank mechanism, as explained, generates an upward and downward oscillating motion for the sliding carriage 9 and the shaft 2 attached to it with the milling tool, which is attached so as to be exchangeable in a slot 23 in the shaft (see FIG. 3). The stroke movements of the sliding carriage 9 would in and of itself lead to a stretching of the toothed belt 14, since the shaft 2 is not moved back and forth in a circular fashion around the axis of the intermediate toothed pulley 13, but rather is moved up and down linearly in a vertical direction by means of the sliding carriage 9. Since, however, the sliding carriage 16 is movably supported along the guide 17 in the horizontal plate, the sliding carriage is moved to the right by the pulling force generated by the upward and downward movement of the shaft 2 over the U-profile 18 in FIG. 2 with each deflection movement, so that the toothed belt 14 does not undergo a change in length. The displacement of the sliding carriage 16 with the intermediate toothed pulley 13 mounted on it only leads to a slight stretching of the toothed belt 12, but it can be selected such that it remains within permissible limits.

The framework 6, onto which the crank mechanism 4 with the associated disk 11, the sliding carriage 9, the shaft 2 and its drive are fastened, is articulated so as to swivel on a fixed framework 24, whereby the center point of the shaft 2 and of the slot 23 for receiving the tool lie on the swivel axis 7. By swiveling the framework 6 by 90°, the shaft is swiveled from its horizontal position into the vertical position, in which the feed screws for rotationally symmetrical containers are milled without oscillation.

Figure 5:
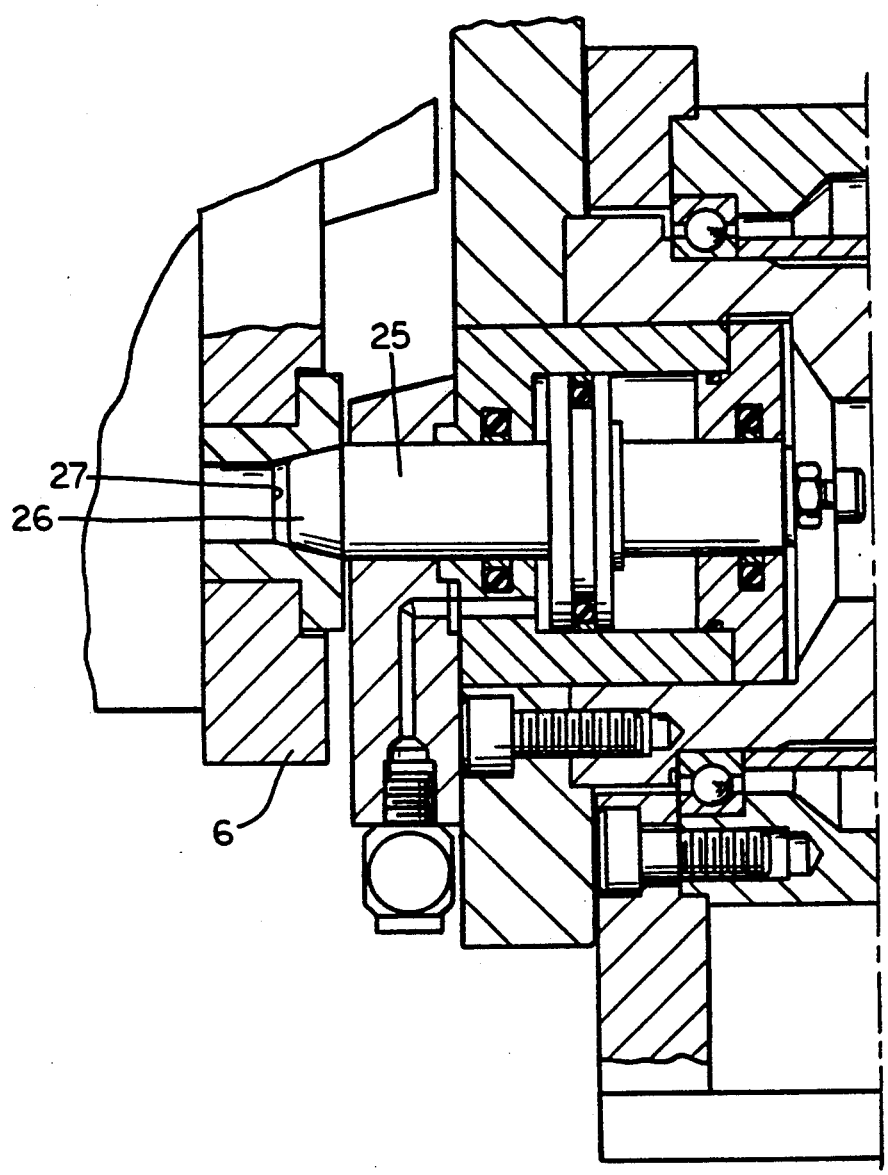
FIG. 5 is an enlarged view of the pneumatic locking procedure for the swiveling framework of the milling machine.

In the respective work position of the swiveling framework 6, a pneumatically actuated locking pin 25 with a conically tapered head section 26 enters into a correspondingly shaped recess 27 in the swiveling framework 6, in order to lock it into the work position (FIG. 5).

I claim:

1. A method of milling the flanks of feed screws comprising the steps of:
    rotating a feed screw blank about its longitudinal axis at a relatively low rotational speed,
    rotating a milling tool at a substantially higher rotational speed about an axis of rotation which is parallel to the longitudinal axis of the feed screw blank and bringing the milling tool into contact with the blank while concurrently causing relative movement between the feed screw blank and the milling tool at a variable speed in the direction of the longitudinal axis, and
    concurrently oscillating the rotating milling tool perpendicularly to the longitudinal axis of the lead screw blank.

2. The method according to claim 1 wherein prior to milling with said milling tool oscillating, performing the steps of:
    pre-milling by two successive milling procedures without oscillating the milling tool and then milling with the milling tool oscillating as aforesaid.

3. The method according to any one of claims 1 or 2 wherein the milling tool is oscillated at a speed of seven to eight times per second.

4. A feed screw milling machine comprising:
    means supporting a feed screw blank for rotating about its longitudinal axis,
    a first shaft and means for driving the first shaft rotationally about its longitudinal axis,
    a milling tool mounted on said shaft and the axis of the shaft is positioned for being in parallelism with the longitudinal axis of a feed screw blank,
    a first carriage on which said first shaft is supported for rotation and a guide on said machine for guiding the first carriage to oscillate up and down perpendicular to said axis of the feed screw blank, and
    means for oscillating said first carriage.

5. The feed screw milling machine according to claim 4 wherein said means for oscillating said first carriage comprises:
    motor means mounted to said machine, and
    a crank mechanism interconnected between said motor means and said first carriage for oscillating said first carriage.

6. The feed screw milling machine according to claim 4 wherein said first carriage oscillates through a distance of approximately 60 mm.

7. The feed screw milling machine according to any one of claims 4, 5 or 6 including:
    a drive motor mounted to said machine and a first toothed pulley driven by said drive motor,
    an intermediate pulley and a first toothed belt coupling the first toothed pulley in driving relation to said intermediate pulley,
    a second carriage and means supporting said second carriage for sliding, said intermediate toothed pulley being mounted for rotating on said second carriage,
    a third toothed pulley fixed on said first shaft for the milling tool, and
    a third toothed belt coupling said intermediate pulley in driving relation to said third pulley.

8. The feed screw milling machine according to claim 7 wherein said second carriage is guided by moving bidirectionally perpendicularly to the line of travel of said first carriage.

9. The feed screw milling machine according to any one of claims 5 or 6 including:
    a frame comprising the machine and carrying said first carriage and said crank and the pulleys and belts for driving said first shaft,
    said frame being supported for swiveling 90° about an axis which is perpendicular to said longitudinal axis of said feed screw blank.

10. The feed screw milling machine according to claim 9 including locking means and a pneumatic actuator for actuating said locking means to lock said frame in a selected working position into which said frame is swiveled.

11. The feed screw milling machine according to claim 10 wherein said locking means comprises a lock bolt having a conically tapered head section for registering in a correspondingly shaped recess in said frame to prevent swiveling by said frame.

* * * * *